(12) United States Patent
Varesio et al.

(10) Patent No.: US 11,664,849 B2
(45) Date of Patent: May 30, 2023

(54) METHOD OF OPERATING A COMMUNICATION NETWORK, CORRESPONDING COMMUNICATION NETWORK AND DEVICES

(71) Applicant: STMicroelectronics S.r.l., Agrate Brianza (IT)

(72) Inventors: Matteo Varesio, Castellamonte (IT); Paolo Treffiletti, Martinengo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/662,127

(22) Filed: May 5, 2022

(65) Prior Publication Data
US 2022/0263541 A1    Aug. 18, 2022

Related U.S. Application Data

(63) Continuation of application No. 17/150,021, filed on Jan. 15, 2021, now Pat. No. 11,356,144.

(30) Foreign Application Priority Data

Jan. 17, 2020  (IT) .................. 102020000000892

(51) Int. Cl.
*H04B 3/54* (2006.01)
*H04B 17/30* (2015.01)

(52) U.S. Cl.
CPC .............. *H04B 3/54* (2013.01); *H04B 17/30* (2015.01)

(58) Field of Classification Search
CPC ......... H04B 3/54; H04B 17/30; H04W 40/24; H04L 45/26; H04L 43/08; H04L 43/10; H04L 45/302; H04L 45/70
See application file for complete search history.

(56) References Cited

U.S. PATENT DOCUMENTS 11,233,540 B2   1/2022   Varesio et al.
2009/0303900 A1  12/2009   Cho et al.
(Continued)

FOREIGN PATENT DOCUMENTS

CN    103563310 A    2/2014
CN    103828440 A    5/2014
(Continued)

OTHER PUBLICATIONS

Boillot, M., "Advanced Smart Grids for Distribution System Operators," Metering: A Core Activity of the DSO's, ISBN: 978-1-848-21737-9, vol. 1, Wiley Publishing, Nov. 2014, p. 9.
(Continued)

*Primary Examiner* — Jean B Corrielus
(74) *Attorney, Agent, or Firm* — Slater Matsil, LLP

(57) ABSTRACT

A communication network comprises a plurality of electronic devices coupled via a plurality of communication links. The communication links comprise links over a first physical medium and links over a second physical medium. A method of operating the network comprises issuing, at an originator device, a path request message directed towards a destination device, transmitting the path request message from the originator device to the destination device through a first set of intermediate devices via a forward sequence of links, issuing, at the destination device, a path reply message directed towards the originator device, and transmitting the path reply message from the destination device to the originator device through a second set of intermediate devices via a reverse sequence of links.

20 Claims, 4 Drawing Sheets

(56) References Cited

U.S. PATENT DOCUMENTS

| | | |
|---|---|---|
| 2012/0236758 A1 | 9/2012 | Yonge, III et al. |
| 2013/0094597 A1 | 4/2013 | Vijayasankar et al. |
| 2014/0373055 A1* | 12/2014 | Dua .................. H04L 65/60 725/110 |
| 2015/0163134 A1 | 6/2015 | Ananthakrishan et al. |
| 2016/0081005 A1 | 3/2016 | Patil et al. |
| 2016/0150459 A1 | 5/2016 | Patil et al. |
| 2017/0135022 A1 | 5/2017 | Amini et al. |
| 2018/0139679 A1 | 5/2018 | Astrom et al. |
| 2018/0152879 A1 | 5/2018 | Petersen et al. |
| 2020/0084689 A1 | 3/2020 | Arvidson et al. |

FOREIGN PATENT DOCUMENTS

| | | | |
|---|---|---|---|
| CN | 104718732 A | | 6/2015 |
| CN | 108476457 A | | 8/2018 |
| CN | 110300039 A | | 10/2019 |
| JP | H10308979 A | * | 11/1998 |
| WO | 2012038764 A1 | | 3/2012 |
| WO | 2015020717 A1 | | 2/2015 |

OTHER PUBLICATIONS

ITU, "ITU-T: G.9903: Series G: Transmission Systems and Media, Digital Systems and Networks: Access networks—In premises networks: Narrowband orthogonal frequency division multiplexing power line communication transceivers for G3-PLC networks", Aug. 2017, 232 pages.

Kaveh, R., et al., "Enhanced 6LoWPAN Ad hoc routing for G3-PLC," Power Line Communications and its Applications (ISPLC), 2013 17th IEEE International Symposium on, IEEE, Mar. 24, 2013, 6 pages.

Razazian, K., et al., "Enhanced 6LoWPAN Ad Hoc Routing for G3-PLC," IEEE 17th International Symposium on Power Line Communications and its Applications, Mar. 2013, 6 pages.

Texas Instruments, "Hybrid RF and PLC Reference Design to Extend Network Coverage and Reliability," May 2016, 33 pages.

Li, Jianchao, "Research on Hybrid Networking of Power Line Communication and Short-range Wireless Communication", Theses for the Master Degree, North China Electric Power University, School of Electric and Electronic Engineering, Dec. 2016, 49 pages.

Sanz, Alfredo "Evolution of PRIME to PLC-RF hybrid systems", 1st Global Power, Energy and Communication Center Conference (IEEE GPECOM2019), Jun. 12-15, 2019, Turkey, 6 pages.

* cited by examiner

30

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| DEST ||||||||||||||||| ORIG |||||||||||||||
| PMT ||| RES ||||||||||||||||||||||||||||| 
| HOP1-FPA ||||||||||||||||| M1-F ||| RES1-F |||||| HOP1-FPLC ||||||
| ... ||||||||||||||||| ... ||| ... |||||| ... ||||||
| HOPn-FPA ||||||||||||||||| Mn-F ||| RESn-F |||||| HOPn-FPLC ||||||

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| DEST ||||||||||||||||| EXP_ORIG |||||||||||||||
| PMT ||| RES |||||||||||||| ORIG |||||||||||||||
| HOP1-FPA ||||||||||||||||| M1-F ||| RES1-F |||||| HOP1-FPLC ||||||
| ... ||||||||||||||||| ... ||| ... |||||| ... ||||||
| HOPn-FPA ||||||||||||||||| Mn-F ||| RESn-F |||||| HOPn-FPLC ||||||
| HOP1-RPA ||||||||||||||||| M1-R ||| RES1-R |||||| HOP1-RPLC ||||||
| ... ||||||||||||||||| ... ||| ... |||||| ... ||||||
| HOPm-RPA ||||||||||||||||| Mm-R ||| RESm-R |||||| HOPm-RPLC ||||||

FIG. 4

| 0 | | | | | | | | | | 1 | | | | | | 2 | | | | | | | 3 | | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| DEST | | ORIG | |
|---|---|---|---|
| PMT | RES | | |
| HOP1-FPA | M1-F | C1-F | RES1-F | HOP1-FPLC |
| ... | ... | ... | ... | ... |
| HOPn-FPA | Mn-F | Cn-F | RESn-F | HOPn-FPLC |

FIG. 5

| 0 | | | | | | | | | | 1 | | | | | | 2 | | | | | | | 3 | | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| DEST | | EXP_ORIG | |
|---|---|---|---|
| PMT | RES | ORIG | |
| HOP1-FPA | M1-F | C1-F | RES1-F | HOP1-FPLC |
| ... | ... | ... | ... | ... |
| HOPn-FPA | Mn-F | Cn-F | RESn-F | HOPn-FPLC |
| HOP1-RPA | M1-R | C1-R | RES1-R | HOP1-RPLC |
| ... | ... | ... | ... | ... |
| HOPm-RPA | Mm-R | Cm-R | RESm-R | HOPm-RPLC |

METHOD OF OPERATING A COMMUNICATION NETWORK, CORRESPONDING COMMUNICATION NETWORK AND DEVICES

CROSS-REFERENCE TO RELATED APPLICATIONS

This application is a continuation of U.S. patent application Ser. No. 17/150,021, filed Jan. 15, 2021, now U.S. Pat. No. 11,356,144, issued Jun. 7, 2022, which application claims the benefit of Italian Application No. 102020000000892, filed on Jan. 17, 2020, all of which applications are hereby incorporated herein by reference.

TECHNICAL FIELD

The description relates to electric communication techniques. One or more embodiments may be applied to communication in hybrid networks, which comprise physical media of different types.

BACKGROUND

Powerline communication (PLC) networks are known in the art, wherein electronic devices (e.g., smart meters for electricity or gas) are connected one to the other via respective wired links (e.g., node-to-node links).

In this context, G3-PLC is a protocol that facilitates reliable communication (e.g., on the electrical grid) using power line communication technology. The G3-PLC protocol is hosted by the standardization sector of the International Telecommunication Union (ITU, see itu.int), and it is supported by an international association, the G3-PLC Alliance (see g3-plc.com).

In particular, the recommendation ITU-T G.9903 (August 2017) contains the physical layer (PHY) and data link layer (DLL) specification for the G3-PLC narrowband orthogonal frequency division multiplexing (OFDM) power line communication transceivers.

The G3-PLC technology offers the following features:

it uses the existing powerline infrastructure and therefore may not involve the installation of a new, dedicated infrastructure, it is designed for IPv6 and therefore facilitates the implementation of state-of-the-art and scalable networks, it (natively) provides cyber-security through the use of cryptographic techniques, such as AES-128, and it provides a robust mode that allows to operate in harsh conditions, possibly with a negative signal-to-noise ratio (i.e., when the noise level is higher than the signal level).

The G3-PLC protocol covers the Physical layer (layer 1) and the Data Link layer (layer 2) of the OSI model. It has been designed to be used with IPv6 at layer 3 and User Datagram Protocol (UDP) at layer 4.

Recently, usage of G3-PLC protocol in hybrid networks has been proposed. In the present description, the wording "hybrid network" is intended to designate a network wherein different types of media are used to provide the links between nodes, such as power line (PLC) channel(s) and radio (RF) wireless channel(s). In this context, the document "Hybrid RF and PLC Reference Design to Extend Network Coverage and Reliability" by Texas Instruments (TIDUBM3A-April 2016-Revised May 2016, see ti.com) discloses a communication system with dual RF and PLC communications for end equipment of smart grid applications.

SUMMARY

In the field of hybrid communication networks, improved solutions are desirable, for instance for extending the G3-PLC technology with a sub-GHz RF technology for use in smart grid, smart city and smart home applications.

More specifically, it may be desirable to improve a path discovery procedure in hybrid (e.g., PLC+RF) networks.

An object of one or more embodiments is to provide such improved solutions.

According to one or more embodiments, such an object can be achieved by means of a method having the features set forth in the claims that follow.

One or more embodiments may relate to a corresponding communication network.

One or more embodiments may relate to corresponding electronic devices for use in the communication network.

The claims are an integral part of the technical teaching provided herein in respect of the embodiments.

According to one or more embodiments, an improved path discovery procedure may be provided by inserting dedicated channel type fields in the path request messages and in the path reply messages. During the propagation of the path request and path reply messages over the network, the channel type fields may be set to values indicative of the physical medium used in the communication links crossed, thereby providing the final data user with information about the type of links used for propagation of messages between any pair of devices in the network.

BRIEF DESCRIPTION OF THE DRAWINGS

One or more embodiments will now be described, by way of example only, with reference to the annexed figures, wherein:

FIG. 3 is exemplary of the format of a path request (PREQ) message for use in a G3-PLC network according to the ITU-T G.9903 recommendation;

FIG. 4 is exemplary of the format of a path reply (PREP) message for use in a G3-PLC network according to the ITU-T G.9903 recommendation;

FIG. 5 is exemplary of the format of a path request (PREQ) message for use in one or more embodiments;

FIG. 6 is exemplary of the format of a path reply (PREP) message for use in one or more embodiments.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 1:
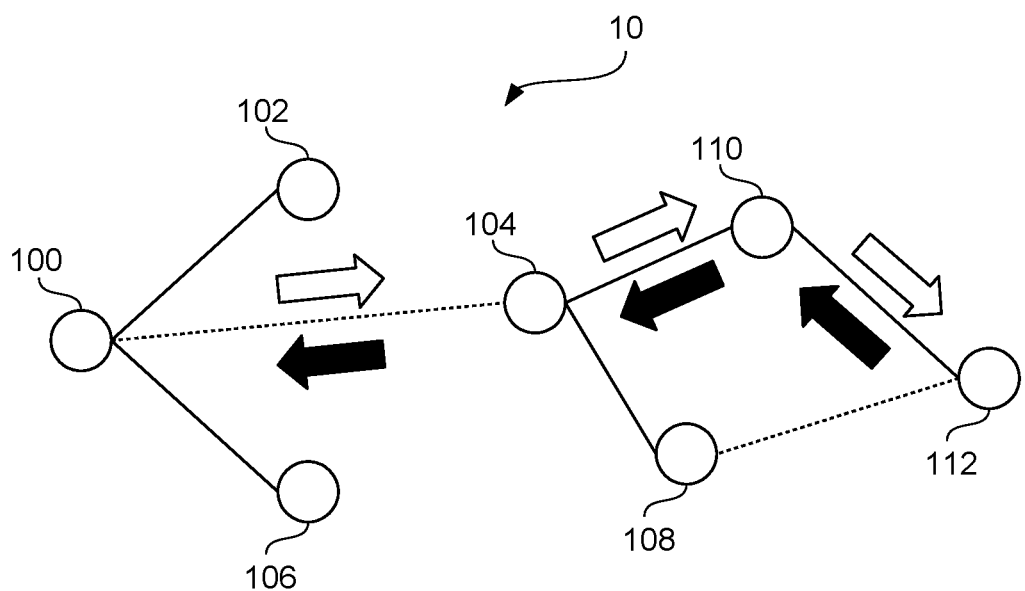
FIG. 1 is a diagram exemplary of data exchange in a hybrid communication network such as a G3-PLC and RF hybrid network.

By way of introduction to the detailed description of exemplary embodiments, one may first refer to FIG. 1 which is exemplary of data exchange in a hybrid communication network such as a G3-PLC and RF hybrid network (also referred to as PLC+RF network in the present description).

As exemplified in FIG. 1, a hybrid communication network 10 may comprise a set of electronic devices (e.g., devices 100, 102, 104, 106, 108, 110 and 112) coupled via node-to-node communication links. The links may be PLC links (as exemplified by the solid lines between pairs of devices 100-102, 100-106, 104-108, 104-110 and 110-112), or RF links (as exemplified by the dashed lines between pairs of devices 100-104 and 108-112).

Exchange of data between two devices in a hybrid communication network 10 may take place via multi-hop transmission, as exemplified by the arrows in FIG. 1.

By way of example, transmitting data from device 100 to device 112 may comprise:

generating a data frame (or message) at the originator device 100, transmitting the data frame from device 100 to intermediate device 104 via a RF link (white arrow), transmitting the data frame from intermediate device 104 to intermediate device 110 via a PLC link (white arrow), and transmitting the data frame from intermediate device 110 to the destination device 112 via a PLC link (white arrow).

In an analogous way, transmitting data from device 112 to device 100 may comprise:

generating a data frame at the originator device 112, transmitting the data frame from device 112 to intermediate device 110 via a PLC link (black arrow), transmitting the data frame from intermediate device 110 to intermediate device 104 via a PLC link (black arrow), and transmitting the data frame from intermediate device 104 to the destination device 100 via a RF link (black arrow).

It will be understood that alternative routes may be used for exchanging data between pairs of devices, e.g., depending on the operating conditions of the network. For instance, in the example illustrated in FIG. 1, communication between nodes 100 and 112 may take place along the route comprising devices 104 and no, or alternatively along the route comprising devices 104 and 108. Also, it will be understood that the routing algorithm may be designed so that the forward path and the reverse path between a pair of devices in the network may not always be the same.

In a hybrid network 10 according to one or more embodiments, the end-to-end connectivity between devices may be provided through different physical channels per each link (or hop). Thus, one or more pairs of devices (possibly, each pair of devices) in the network may be coupled by both a PLC and a RF channel which provide alternative communication options (not illustrated in FIG. 1).

It is noted that extending the G3-PLC protocol with Sub-GHz RF may provide the following improvements:

communication between two nodes can occur indifferently on one of the two channels (PLC or RF) depending on the quality of the communication on each media; the choice of the best channel may be performed internally by the protocol implementation and may thus result to be "transparent" for the final application, possibility of extending the security at MAC level, which is already used in G3-PLC communication, also to the RF channel(s), possibility of transmitting data between two nodes over a second channel, in case of communication failure over the first selected media.

The G3-PLC protocol may be applied mainly in smart metering and smart city applications. It is noted that, in such environments, being able to provide (e.g., to the network administrator) statistics and parameters for the components (e.g., for each component) installed in the network may be desirable.

Conventionally, the information usually provided comprises the route traversed by a packet (or frame) from its originator node to its final destination node. Such information may relate to the number of devices crossed to reach the destination (or the number of "hops" constituting the route), the quality of each intermediate link, and other parameters of the network.

Therefore, the network administrator may monitor if the routes between devices in the network are changing from time to time. It may also be possible to detect and prevent issues in the network, and it may be possible to evaluate the performance of the network and perform other statistical analysis.

To this regard, the G3-PLC protocol defines a "Path Discovery" routine (or command) which may be generally issued for maintenance and/or performance evaluation purposes.

A path discovery routine may be executed by any originator device to get information on the route followed to reach a certain destination device, with the aim of obtaining information about each link along that route.

Figure 2:
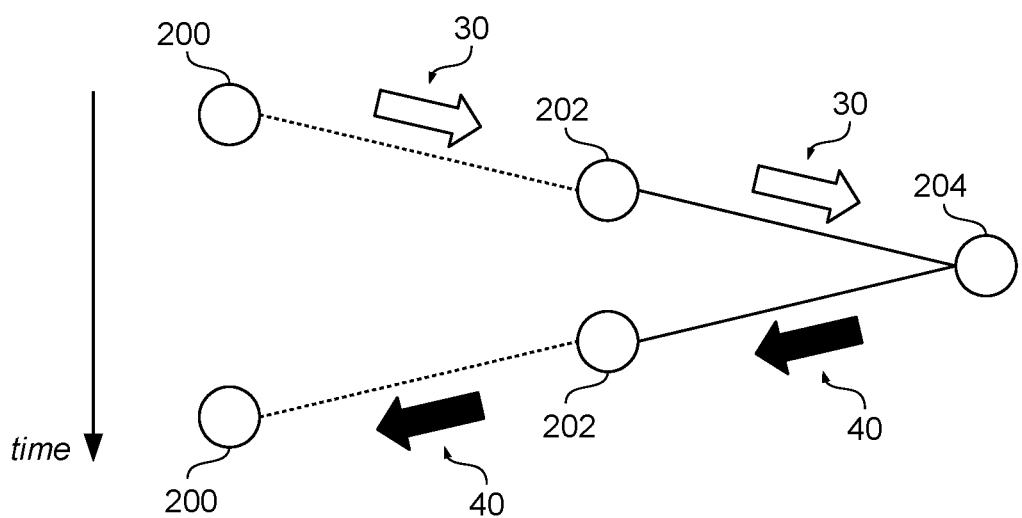
FIG. 2 is a diagram exemplary of possible propagation of a path discovery command in a hybrid communication network according to one or more embodiments.

For instance, FIG. 2 is a diagram exemplary of possible propagation (over time) of a path discovery frame in one or more embodiments. In this exemplary case, a path discovery routine (or procedure) is issued by an originator device 200 with reference to a destination device 204.

As specified in the G3-PLC protocol, a path discovery routine may involve exchanging two control messages called Path Request (PREQ) and Path Reply (PREP) along a certain route, thereby collecting information for each link (e.g., the link quality) in that route.

In one or more embodiments, a route along which PREQ and PREP messages are exchanged may be a route which has been previously "installed" in the network, e.g., because data frames have already been exchanged over that route.

As exemplified in FIG. 2, an originator device 200 may generate a PREQ message by:

setting a PREQ destination address field with the address of the node 204 towards where the PREQ message will be propagated, (e.g., as directed by the upper layers), setting a PREQ originator address field with its own address, setting a metric type (e.g., as directed by the upper layers) designating the link cost to report in path discovery messages.

Upon receiving a PREQ message, the i-th node in the forward path (such as the intermediate node 202) may process the PREQ message by:

appending its address (e.g., a 16-bit address) to the Hop-i forward path address field, appending the link cost designated by the path metric type and computed based on the incoming frame to the Hop-i forward path link cost field.

If, while the PREQ message is being processed by a node, the PREQ destination address is found in the routing table, then the PREQ message is forwarded to the next hop towards destination (e.g., node 204).

If the PREQ destination address is not found in the routing table, or if the PREQ transmission fails, or if the PREQ destination address is the address of the node that received the PREQ message or an address stored in its destination address set, then a Path Reply (PREP) message may be generated.

As exemplified in FIG. 2, a destination device 204 may generate a PREP message by:

setting a PREP destination address field with the address of the PREQ originator device 200, setting a PREP expected originator address field with the address of the PREQ destination device 204, setting a PREP originator address field with its own address or with the address of the PREQ destination device when it is in the destination address set, appending the "path metric type" field, the "metric not supported" field, the reserved bits, the forward path addresses and their associated link cost as conveyed by the PREQ message.

On receiving a PREP message, the j-th node in the reverse path (such as the intermediate node 202) may process the PREP message by:

appending its address (e.g., a 16-bit address) to the Hop-j reverse path address field, appending the link cost designated by the path metric type and updated with the incoming frame to the Hop-j reverse path link cost field.

If, while the PREP message is being processed by a node, the PREP destination address is found in the routing table, then the PREP message is forwarded to the next hop towards destination (e.g., node 200).

If the PREP destination address is not found in the routing table, or if the PREP transmission fails, then the node may discard the PREP message.

If the PREP destination address is the address of the node receiving the PREP, then the information (in the form of a table of addresses of the nodes constituting the path—or part of the path—and their associated forward and reverse link costs) is sent to the upper layer.

Therefore, in conventional G3-PLC networks, a PREQ message 30 may have the structure exemplified in FIG. 3, comprising the following fields:

DEST (destination), e.g. 16 bits: destination address of the PREQ packet;

ORIG (originator), e.g. 16 bits: originator address of the PREQ packet;

PMT (PathMetricType), e.g. 4 bits: metric type to be used for reporting the link cost;

RES (reserved), e.g. 28 bits: reserved field by ITU-T, may be set to o;

HOP1-FPA (Hop-1 Forward Path Address), e.g. 16 bits: address of the first node in the forward path;

M1-F (Hop-1 Forward Path Metric Not Supported), e.g. 1 bit: a field to indicate whether the selected path metric type is supported by the first node in the forward path, set to 0 if the metric is supported by the node, set to 1 if the metric is not supported by the node;

RES1-F (reserved), e.g. 7 bits: reserved field by ITU-T, may be set to 0;

HOP1-FPLC (Hop-1 Forward Path Link Cost), e.g. 8 bits: link cost of the first node in the forward path;

HOPn-FPA (Hop-n Forward Path Address), e.g. 16 bits: address of the last ($n^{th}$) node in the forward path;

Mn-F (Hop-N Forward Path Metric Not Supported), e.g. 1 bit: a field to indicate whether the selected path metric type is supported by the last ($n^{th}$) node in the forward path, set to 0 if the metric is supported by the node, set to 1 if the metric is not supported by the node;

RESn-F (reserved), e.g. 7 bits: reserved field by ITU-T, may be set to 0;

HOPn-FPLC (Hop-n Forward Path Link Cost), e.g. 8 bits: link cost of the last ($n^{th}$) node in the forward path.

As exemplified in FIG. 3, the PREQ message 30 may comprise a plurality of fields HOPi-FPA, Mi-F, RESi-F and HOPi-FPLC corresponding to intermediate nodes ($i^{th}$) crossed by the PREQ message during propagation from the originator ($1^{st}$) node to the destination ($n^{th}$) node. Such fields may be appended to the PREQ message during propagation as a result of processing of the PREQ message in intermediate nodes.

In conventional G3-PLC networks, a PREP message 40 may have the structure exemplified in FIG. 4, comprising the following fields:

DEST (destination), e.g. 16 bits: destination address of the PREP packet;

EXP_ORIG (expected originator), e.g. 16 bits: destination address of the PREQ packet and expected originator address of the PREP packet;

PMT (PathMetricType), e.g. 4 bits: metric type to be used for reporting the link cost;

RES (reserved), e.g. 12 bits: reserved field by ITU-T, may be set to 0;

ORIG (originator), e.g. 16 bits: originator address of the PREP packet;

HOP1-FPA (Hop-1 Forward Path Address), e.g. 16 bits: address of the first node in the forward path;

M1-F (Hop-1 Forward Path Metric Not Supported), e.g. 1 bit: a field to indicate whether the selected path metric type is supported by the first node in the forward path, set to 0 if the metric is supported by the node, set to 1 if the metric is not supported by the node;

RES1-F (reserved), e.g. 7 bits: reserved field by ITU-T, may be set to 0;

HOP1-FPLC (Hop-1 Forward Path Link Cost), e.g. 8 bits: link cost of the first node in the forward path;

HOPn-FPA (Hop-n Forward Path Address), e.g. 16 bits: address of the last ($n^{th}$) node in the forward path;

Mn-F (Hop-n Forward Path Metric Not Supported), e.g. 1 bit: a field to indicate whether the selected path metric type is supported by the last ($n^{th}$) node in the forward path, set to 0 if the metric is supported by the node, set to 1 if the metric is not supported by the node;

RESn-F (reserved), e.g. 7 bits: reserved field by ITU-T, may be set to 0;

HOPn-FPLC (Hop-n Forward Path Link Cost), e.g. 8 bits: link cost of the last ($n^{th}$) node in the forward path;

HOP1-RPA (Hop-1 Reverse Path Address), e.g. 16 bits: address of the first node in the reverse path;

M1-R (Hop-1 Reverse Path Metric Not Supported), e.g. 1 bit: a field to indicate whether the selected path metric type is supported by the first node in the reverse path, set to 0 if the metric is supported by the node, set to 1 if the metric is not supported by the node;

RES1-R (reserved), e.g. 7 bits: reserved field by ITU-T, may be set to 0;

HOP1-RPLC (Hop-1 Reverse Path Link Cost), e.g. 8 bits: link cost of the first node in the reverse path;

HOPm-RPA (Hop-m Reverse Path Address), e.g. 16 bits: address of the last ($m^{th}$) node in the reverse path;

Mm-R (Hop-m Reverse Path Metric Not Supported), e.g. 1 bit: a field to indicate whether the selected path metric type is supported by the last ($m^{th}$) node in the reverse path, set to 0 if the metric is supported by the node, set to 1 if the metric is not supported by the node;

RESm-R (reserved), e.g. 7 bits: reserved field by ITU-T, may be set to 0;

HOPm-RPLC (Hop-m Reverse Path Link Cost), e.g. 8 bits: link cost of the last ($m^{th}$) node in the reverse path.

Therefore, a PREP message 40 may be generated by appending to a corresponding PREQ message 30 the information concerning the nodes crossed along the reverse path of the path discovery routine.

Therefore, it is noted that the conventional G3-PLC protocol does not provide the capability of collecting information on the channel type (e.g., PLC or RF) used for each link in the forward and reverse paths of a path discovery routine, insofar as the PREQ and PREP messages have a predefined format that carries information only about link quality (e.g., link cost) for each link.

Thus, one or more embodiments aim at extending the capability of the path discovery routine (or procedure) in order to provide the information about the type of media traversed per (each) link to reach a certain destination.

In one or more embodiments, additional fields may be provided in path discovery protocol messages. Such additional fields may carry information about the channel type over which data between two nodes is transmitted, e.g., it may indicate whether the corresponding link is a PLC or a RF link. For instance, the value of the field may be set to 0 to indicate a PLC channel, and may be set to 1 to indicate a RF channel.

Such supplementary fields may be provided by using at least partially the reserved bits of the fields RES1-F, . . . , RESn-F, RESi-R, . . . , RESm-R of the PREQ and PREP messages.

FIGS. 5 and 6 are exemplary of possible formats of a path request (PREQ) message 30' and a path reply (PREP) message 40', respectively, for use in one or more embodiments.

As exemplified in FIG. 5, in one or more embodiments a PREQ message 30' may comprise, for each node traversed by the PREQ message, a "channel type" field C1-F, . . . , Cn-F following the respective "Forward Path Metric Not Supported" field M1-F, . . . , Mn-F.

Similarly, as exemplified in FIG. 6, in one or more embodiments a PREP message 40' may comprise, for each node traversed by the PREP message, a "channel type" field C1-R, . . . , Cm-R following the respective "Reverse Path Metric Not Supported" field M1-R, . . . , Mm-R (in addition to the content of the respective PREQ message 30' as exemplified in FIG. 5).

In one or more embodiments, the bits occupied by the channel type fields C1-F, . . . , Cn-F, C1-R, . . . , Cm-R (both in the PREQ message and in the PREP message) may extend at least partially in the respective reserved fields RES1-F, . . . , RESn-F, RESFR, . . . , RESm-R, thereby providing backward compatibility with previous versions of the G3-PLC protocol.

While FIGS. 5 and 6 are exemplary of embodiments in which the channel type fields C1-F, . . . , Cn-F, C1-R, . . . , Cm-R are contiguous to the respective "Path Metric Not Supported" fields M1-F, . . . , Mn-F, M1-R, . . . , Mm-R, this arrangement is not mandatory. In general, the channel type fields may be located at any position within the reserved fields RES1-F, . . . , RESn-F, RES1-R, . . . , RESm-R.

As exemplified in FIGS. 5 and 6, the channel type fields may have a length of 1 bit, e.g., if the hybrid network only provides for two possible physical media between each pair of nodes (e.g., the channel type field may be set to 0 to indicate a PLC link, and to 1 to indicate a RF link).

However, in one or more embodiments the channel type fields may be longer than 1 bit, e.g., in order to provide the possibility to encode a higher amount of information. This may be the case, for instance, in hybrid networks comprising more than two different physical media, or hybrid networks wherein a same physical media may have different characteristics to be encoded (e.g., different RF channels having different frequency).

Therefore, in one or more embodiments, a Path Discovery routine as exemplified in FIG. 2 may provide information not only about the quality of each link between the traversed nodes (both in the forward direction and in the reverse direction), but also about the type of physical medium implementing each link between the traversed nodes, such as for instance:

link 200→ 202 (forward): channel RF,
link 202→ 204 (forward): channel PLC,
link 204→ 202 (reverse): channel PLC, and
link 202→ 200 (reverse): channel RF.

In the context of network maintenance and/or performance evaluation, one or more embodiments may thus facilitate providing information on how a hybrid network is operating, for example in case of a communication failure or if the desired performance is not met.

Information about the channel type may be provided, for instance, to a network administrator for taking countermeasures in order to reach the expected performance (e.g., the expected Key Performance Indicators—KPIs).

One or more embodiments may provide the possibility to operate remotely, without the need to perform field or in situ analysis.

Figure 7:
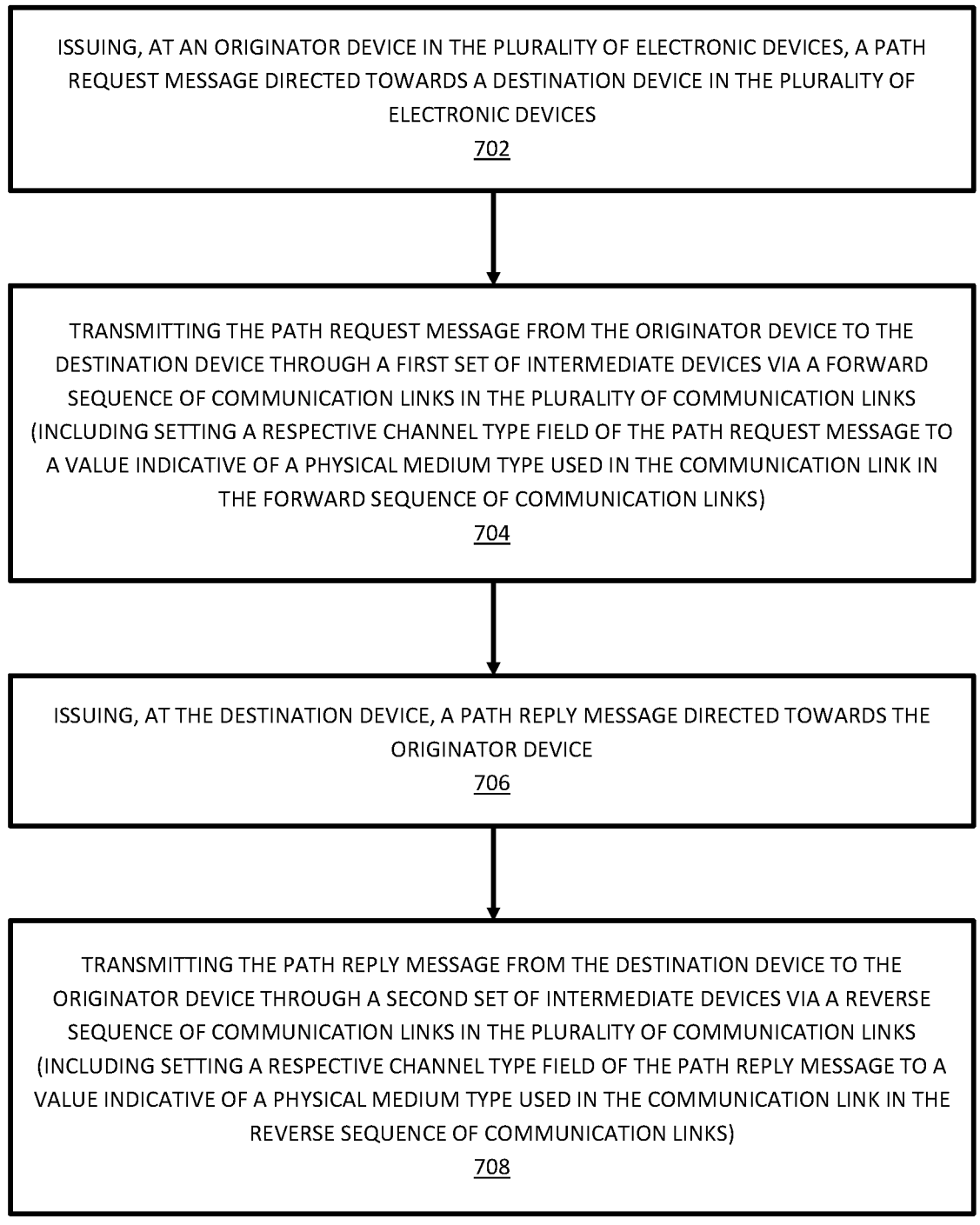
FIG. 7 is a flow diagram of an exemplary method of operating a communication network.

FIG. 7 illustrates an embodiment method 700 of operating a communication network. The communication network comprises a plurality of electronic devices coupled via a plurality of communication links, the plurality of communication links comprising at least one first communication link over a first physical medium and at least one second communication link over a second physical medium different than the first physical medium.

The method comprises, at step 702, issuing, at an originator device in the plurality of electronic devices, a path request message directed towards a destination device in the plurality of electronic devices.

The method further comprises, at step 705, transmitting the path request message from the originator device to the destination device through a first set of intermediate devices via a forward sequence of communication links in the plurality of communication links. The transmitting the path request message via each communication link in the forward sequence of communication links comprises setting a respective channel type field of the path request message to a value indicative of a physical medium type used in the communication link in the forward sequence of communication links.

The method further comprises, at step 706, issuing, at the destination device, a path reply message directed towards the originator device.

The method further comprises, at step 708, transmitting the path reply message from the destination device to the originator device through a second set of intermediate devices via a reverse sequence of communication links in the plurality of communication links. The transmitting the path reply message via each communication link in the reverse sequence of communication links comprises setting a respective channel type field of the path reply message to a value indicative of a physical medium type used in the communication link in the reverse sequence of communication links.

As exemplified herein, a (e.g., hybrid) communication network (e.g., 10) may comprise a plurality of electronic devices (e.g., 100, . . . , 112) coupled via a plurality of communication links. The plurality of communication links may comprise at least one first communication link over a first physical medium and at least one second communication link over a second physical medium.

As exemplified herein, a method of operating such communication network may comprise:

issuing, at an originator device (e.g., 200) in the plurality of electronic devices, a path request message (e.g., 30') directed towards a destination device (e.g., 204) in the plurality of electronic devices, transmitting the path request message from the originator device to the destination device through a first set of intermediate devices (e.g., 202) via a forward sequence of communication links in the plurality of communication links, issuing, at the destination device, a path reply message (e.g., 40') directed towards the originator device, and transmitting the path reply message from the destination device to the originator device through a second set of intermediate devices via a reverse sequence of communication links in the plurality of communication links.

As exemplified herein, transmitting the path request message via a communication link in the forward sequence of communication links may comprise setting a respective channel type field (e.g., C1-F, . . . , Cn-F) of the path request message to a value indicative of the physical medium used in the communication link in the forward sequence of communication links, and transmitting the path reply message via a communication link in the reverse sequence of communication links may comprise setting a respective channel type field (e.g., C1-R, . . . , Cm-R) of the path reply message to a value indicative of the physical medium used in the communication link in the reverse sequence of communication links.

As exemplified herein, the path request message and the path reply message may be encoded according to ITU-T G.9903 standard, and the respective channel type fields of the path request message and of the path reply message may be located between respective metric not supported fields (e.g., M1-F, . . . , Mn-F, M1-R, . . . , Mm-R) and link cost fields (e.g., HOP1-FPLC, . . . , HOPn-FPLC, HOP1-RPLC, . . . , HOPm-RPLC).

As exemplified herein, the electronic devices in the plurality of electronic devices may be configured for:

issuing, at an originator device in the plurality of electronic devices, a path request message directed towards a destination device in the plurality of electronic devices, transmitting the path request message from the originator device to the destination device through a first set of intermediate devices via a forward sequence of communication links in the plurality of communication links, issuing, at the destination device, a path reply message directed towards the originator device, and transmitting the path reply message from the destination device to the originator device through a second set of intermediate devices via a reverse sequence of communication links in the plurality of communication links.

As exemplified herein, the first physical medium may comprise a wired powerline (PLC) channel and the second physical medium may comprise a radio-frequency (RF) channel.

As exemplified herein, the radio-frequency communication links may be operated at a frequency lower than 1 GHz.

As exemplified herein, the communication network may comprise a power supply grid and the electronic devices may comprise smart meters and/or data concentrators.

As exemplified herein, a device for use in a communication network as an originator device may be configured for:

being coupled to at least one further device in the communication network via at least one communication link, transmitting, via the at least one communication link, a path request message addressed to a destination device in the communication network, receiving, via the at least one communication link, a path reply message from the destination device in the communication network, and setting a respective channel type field of the path request message to a value indicative of the physical medium used in the at least one communication link.

As exemplified herein, a device for use in a communication network as an intermediate device or as a destination device may be configured for:

being coupled to at least one further device in the communication network via at least one communication link, receiving, via the at least one communication link, a path request message from an originator device in the communication network directed towards a destination device in the communication network, and i) as a result of the device being the destination device, issuing a path reply message directed towards the originator device, ii) as a result of the device not being the destination device, transmitting via the at least one communication link the path request message towards the destination device, and transmitting via the at least one communication link a path reply message received from the destination device towards the originator device, setting a respective channel type field of the path request message to a value indicative of the physical medium used in the at least one communication link, setting a respective channel type field of the path reply message to a value indicative of the physical medium used in the at least one communication link.

Without prejudice to the underlying principles, the details and embodiments may vary, even significantly, with respect to what has been described by way of example only, without departing from the extent of protection.

The extent of protection is defined by the annexed claims.

What is claimed is:

1. A method of operating a communication network, the communication network comprising a plurality of electronic devices coupled via a plurality of communication links, the plurality of communication links comprising at least one first communication link over a first physical medium and at least one second communication link over a second physical medium different than the first physical medium, the method comprising:

issuing, at an originator device in the plurality of electronic devices, a path request message directed towards a destination device in the plurality of electronic devices;

transmitting the path request message from the originator device to the destination device through a first set of intermediate devices via a forward sequence of communication links in the plurality of communication links, the transmitting the path request message via each communication link in the forward sequence of communication links comprising setting a respective media type field of the path request message to a value indicative of a physical medium type used in the communication link in the forward sequence of communication links;

issuing, at the destination device, a path reply message directed towards the originator device; and transmitting the path reply message from the destination device to the originator device through a second set of intermediate devices via a reverse sequence of communication links in the plurality of communication links, the transmitting the path reply message via each communication link in the reverse sequence of communication links comprising setting a respective media type field of the path reply message to a value indicative of a physical medium type used in the communication link in the reverse sequence of communication links, each respective media type field of the path request message and of the path reply message being one-bit, in which a zero-value represents a wired powerline communication (PLC) link, and a one-value represents a radio-frequency (RF) link.

2. The method of claim 1, wherein the path request message and the path reply message are encoded according to ITU-T G.9903 standard, and the respective media type fields of the path request message and of the path reply message are located between respective metric not supported fields and link cost fields.

3. The method of claim 1, wherein the first physical medium comprises a wired PLC link, and the second physical medium comprises an RF link.

4. The method of claim 3, further comprising operating the RF link at a frequency lower than 1 GHz.

5. A communication network comprising a plurality of electronic devices coupled via a plurality of communication links, the plurality of communication links comprising at least one first communication link over a first physical medium and at least one second communication link over a second physical medium different than the first physical medium, wherein the communication network comprises:

an originator device in the plurality of electronic devices, the originator device configured to issue a path request message directed towards a destination device in the plurality of electronic devices;

a first set of intermediate devices configured to transmit the path request message from the originator device to the destination device via a forward sequence of communication links in the plurality of communication links, wherein the first set of intermediate devices configured to transmit the path request message via each communication link in the forward sequence of communication links comprises the first set of intermediate devices configured to set a respective media type field of the path request message to a value indicative of a physical medium type used in the communication link in the forward sequence of communication links;

the destination device, configured to issue a path reply message directed towards the originator device; and a second set of intermediate devices configured to transmit the path reply message from the destination device to the originator device via a reverse sequence of communication links in the plurality of communication links, wherein the second set of intermediate devices configured to transmit the path reply message via each communication link in the reverse sequence of communication links comprises the second set of intermediate devices configured to set a respective media type field of the path reply message to a value indicative of a physical medium type used in the communication link in the reverse sequence of communication links, wherein each respective media type field of the path request message and of the path reply message is one-bit, in which a zero-value represents a wired powerline communication (PLC) link, and a one-value represents a radio-frequency (RF) link.

6. The communication network of claim 5, wherein the first physical medium comprises a wired PLC link, and the second physical medium comprises an RF link.

7. The communication network of claim 6, wherein the RF link is operated at a frequency lower than 1 GHz.

8. The communication network of claim 7, wherein the communication network comprises a power supply grid and the electronic devices comprise smart meters and/or data concentrators.

9. An originator device for use in a communication network comprising a plurality of electronic devices coupled via a plurality of communication links, the plurality of communication links comprising at least one first communication link over a first physical medium and at least one second communication link over a second physical medium different than the first physical medium, wherein the originator device comprises:

a transceiver configured to:
couple the originator device to at least one further device in the communication network via at least one of the plurality of communication links;
transmit, via the at least one of the plurality of communication links, a path request message addressed to a destination device in the communication network; and
receive, via the at least one of the plurality of communication links, a path reply message from the destination device in the communication network, wherein the path reply message comprises a sequence of reverse communication link entries, each reverse communication link entry comprising a respective media type field having a value indicative of a physical medium type used in the respective reverse communication link;

wherein the originator device is configured to set an additional media type field of the path request message to a value indicative of a physical medium type used in the at least one of the plurality of communication links; and wherein each respective media type field and each additional media type field is one-bit, in which a zero-value represents a wired powerline communication (PLC) link, and a one-value represents a radio-frequency (RF) link.

10. The originator device of claim 9, wherein the first physical medium comprises a wired PLC link, and the second physical medium comprises an RF link.

11. The originator device of claim 10, wherein the RF link is operated at a frequency lower than 1 GHz.

12. The originator device of claim 11, wherein the communication network comprises a power supply grid and the electronic devices comprise smart meters and/or data concentrators.

13. A destination device for use in a communication network comprising a plurality of electronic devices coupled via a plurality of communication links, the plurality of communication links comprising at least one first communication link over a first physical medium and at least one second communication link over a second physical medium different than the first physical medium, wherein the destination device comprises:
a transceiver configured to:
couple the destination device to at least one further device in the communication network via at least one of the plurality of communication links;
receive, via the at least one of the plurality of communication links, a path request message from an originator device in the communication network directed towards the destination device in the communication network; and
issue a path reply message directed towards the originator device;
wherein the destination device is configured to:
set a respective media type field of the path request message to a value indicative of a physical medium type used in the at least one of the plurality of communication links; and
set a respective media type field of the path reply message to a value indicative of a physical medium type used in the at least one of the plurality of communication links, wherein each respective media type field of the path request message and of the path reply message is one-bit, in which a zero-value represents a wired powerline communication (PLC) link, and a one-value represents a radio-frequency (RF) link.

14. The destination device of claim 13, wherein the first physical medium comprises a wired PLC link, and the second physical medium comprises an RF link.

15. The destination device of claim 14, wherein the RF link is operated at a frequency lower than 1 GHz.

16. The destination device of claim 13, wherein the communication network comprises a power supply grid and the electronic devices comprise smart meters and/or data concentrators.

17. An intermediate device for use in a communication network comprising a plurality of electronic devices coupled via a plurality of communication links, the plurality of communication links comprising at least one first communication link over a first physical medium and at least one second communication link over a second physical medium different than the first physical medium, wherein the intermediate device comprises:
a first transceiver configured to:
couple to at least one first further device in the communication network via at least one of the plurality of communication links; and
receive, via the at least one of the plurality of communication links, a path request message from an originator device in the communication network directed towards a destination device in the communication network;
wherein the intermediate device is configured to set a respective media type field of the path request message to a value indicative of a physical medium type used in the at least one of the plurality of communication links;
a second transceiver configured to:
couple to at least one second further device in the communication network via at least another of the plurality of communication links; and
transmit, via the at least one of the plurality of communication links, the path request message towards the destination device;
wherein the intermediate device is further configured to set a respective media type field of a path reply message received from the destination device to a value indicative of the physical medium type used in the at least another of the plurality of communication links;
wherein each respective media type field of the path request message and of the path reply message is one-bit, in which a zero-value represents a wired powerline communication (PLC) link, and a one-value represents a radio-frequency (RF) link; and
wherein the first transceiver is further configured to transmit, via the at least one of the plurality of communication links, the path reply message towards the originator device.

18. The intermediate device of claim 17, wherein the first physical medium comprises a wired PLC link, and the second physical medium comprises an RF link.

19. The intermediate device of claim 18, wherein the RF link is operated at a frequency lower than 1 GHz.

20. The intermediate device of claim 17, wherein the communication network comprises a power supply grid and the electronic devices comprise smart meters and/or data concentrators.

* * * * *